(12) United States Patent
Wildgruber

(10) Patent No.: US 12,212,244 B2
(45) Date of Patent: Jan. 28, 2025

(54) ENERGY SYSTEM FOR AN ELECTRIC VEHICLE

(71) Applicant: AUDI AG, Ingolstadt (DE)

(72) Inventor: Mario Wildgruber, Rohrbach (DE)

(73) Assignee: AUDI AG, Ingolstadt (DE)

(*) Notice: Subject to any disclaimer, the term of this patent is extended or adjusted under 35 U.S.C. 154(b) by 177 days.

(21) Appl. No.: 17/975,456

(22) Filed: Oct. 27, 2022

(65) Prior Publication Data

US 2023/0134085 A1 May 4, 2023

(30) Foreign Application Priority Data

Oct. 28, 2021 (DE) .......................... 102021128140.7

(51) Int. Cl.
| | | |
|---|---|---|
| *H02M 3/335* | (2006.01) | |
| *B60L 50/60* | (2019.01) | |
| *B60R 16/03* | (2006.01) | |

(52) U.S. Cl.
CPC ......... *H02M 3/33569* (2013.01); *B60L 50/60* (2019.02); *B60R 16/03* (2013.01); *B60L 2210/10* (2013.01); *H02J 2207/20* (2020.01)

(58) Field of Classification Search
CPC .............. H02M 3/33573; H02M 3/01; H02M 3/33571; H02M 7/4815; H02M 1/0074; H02M 3/33576; H02M 3/33584; B60L 50/60; B60L 2210/12; B60L 1/00; B60L 3/0092; B60L 3/04; B60L 58/20; B60L 1/003; B60R 16/03; Y02T 10/70; Y02T 10/7072; Y02T 90/14; H02J 7/0063; H02J 7/007

USPC ......................................... 307/11, 18, 48, 63
See application file for complete search history.

(56) References Cited

U.S. PATENT DOCUMENTS

| | | | |
|---|---|---|---|
| 10,079,541 B1 | 9/2018 | Taban | |
| 2014/0313784 A1 | 10/2014 | Strzalkowski | |
| 2016/0241028 A1* | 8/2016 | Long | H02J 7/0025 |
| 2017/0214252 A1* | 7/2017 | Preindl | H02J 7/345 |
| 2020/0055405 A1* | 2/2020 | Duan | H02J 7/0014 |
| 2021/0159710 A1* | 5/2021 | Furukawa | H02J 13/00007 |
| 2022/0376536 A1* | 11/2022 | Grohmann | H02J 1/10 |
| 2023/0121220 A1* | 4/2023 | Gannamaneni | B60L 53/20 320/109 |
| 2023/0150680 A1* | 5/2023 | Ukumori | H02J 7/00 307/9.1 |
| 2023/0261559 A1* | 8/2023 | Redler | H02M 1/0074 307/18 |

FOREIGN PATENT DOCUMENTS

| | | |
|---|---|---|
| DE | 102017114339 A1 | 1/2019 |
| EP | 2169817 A1 | 3/2010 |
| EP | 2662964 B1 | 12/2017 |
| EP | 3291446 A1 | 3/2018 |
| JP | 2016195511 A | 11/2016 |

* cited by examiner

*Primary Examiner* — Daniel Kessie
*Assistant Examiner* — Terrence R Willoughby
(74) *Attorney, Agent, or Firm* — Seed IP Law Group LLP

(57) ABSTRACT

A system for the electrical power supply of a vehicle and a method for the electrical power supply of a vehicle are described.

10 Claims, 1 Drawing Sheet

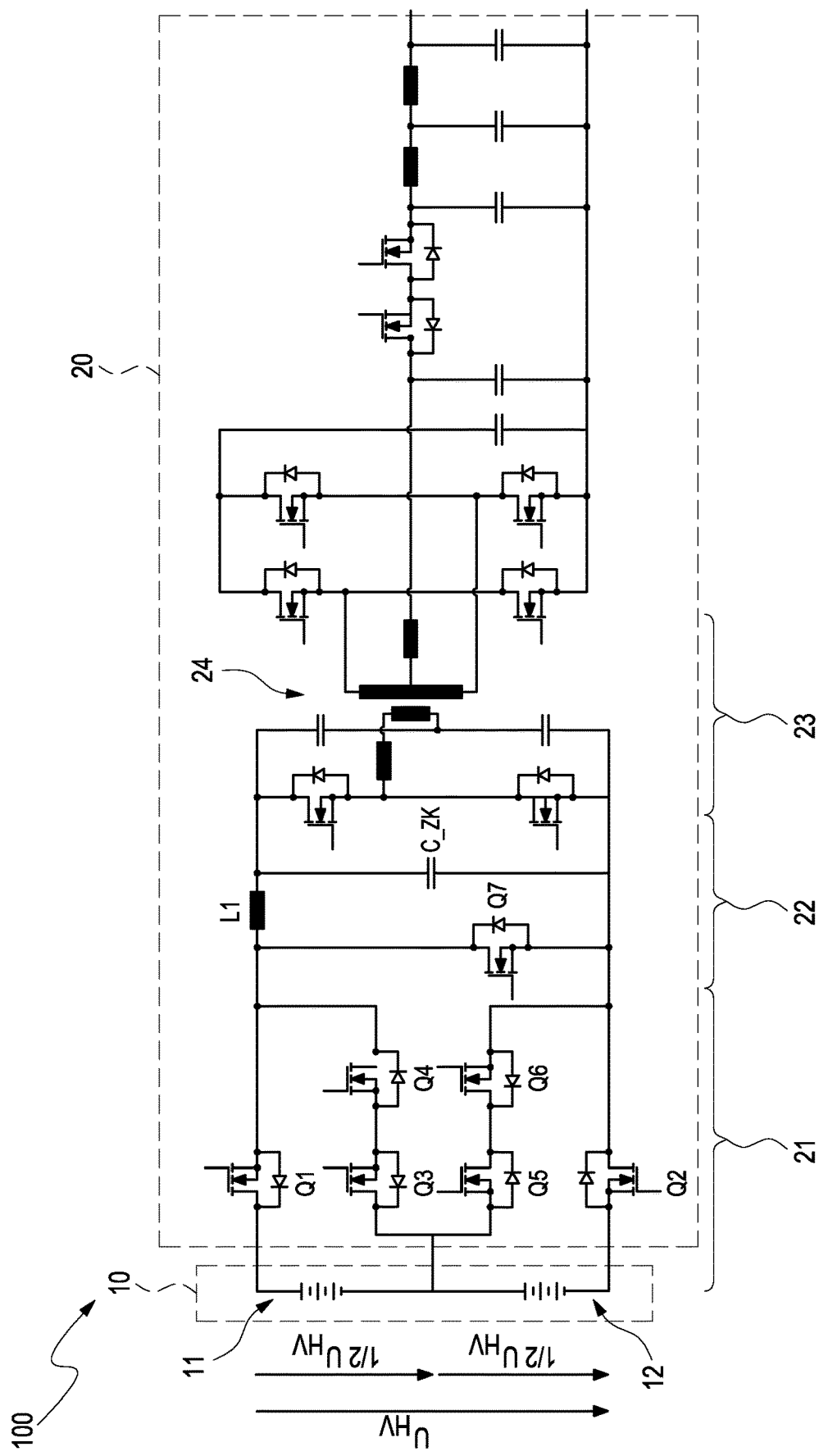

ENERGY SYSTEM FOR AN ELECTRIC VEHICLE

BACKGROUND

Technical Field

Embodiments of the invention relate to a system for the electrical power supply of a vehicle and a method for the electrical power supply of a vehicle.

Description of the Related Art

In present-day electrically propelled vehicles such as plug-in hybrid-electric vehicles (PHEV), battery electric vehicles (BEV), or hybrid electric vehicles (HEV), which are outfitted with a high-voltage energy accumulator (HV battery), direct current converters (DC/DC converters) are used to power the low-voltage onboard network (LV onboard network). The DC/DC converters are primarily powered by the HV battery and are connected after the battery contactor to the full system voltage. These HV networks are not subject to any ASIL safety classification at present and therefore they are only conditionally suited—or not suited at all—to use with highly automated driver assist systems—depending on the modification.

There is known from U.S. Pat. No. 10,079,541 B1 a switching power transformer circuit, comprising a preregulator circuit which is operated in step-down, step-up, or bypass mode and a first switching circuit, which receives an input DC voltage and puts out a first DC voltage; a resonance circuit having a second circuit, which receives the first DC voltage and puts out an output DC voltage; a resonance control circuit, which regulates the output DC voltage by transmitting a Link-Min-Set-Control signal and a Link-Max-Set-Control signal and by controlling a switching frequency of the second circuit; and a preregulator control circuit, which receives the Link-Min-Set-Control signal and the Link-Max-Set-Control signal and controls the first circuit, based on the Link-Min-Set-Control signal and the Link-Max-Set-Control signal to regulate the first DC voltage.

EP 2 169 817 A1 discloses a power supply adjustment device, comprising a primary isolation transformer unit, which is adapted to transform voltage or current of an input power supply signal and to put out a power supply signal which fulfills an expected voltage or current requirement; a voltage adjustment control unit, which is adapted to put out a setpoint control signal in relation to the output voltage according to an expected output voltage and a tracked signal which is provided by a driven device; and a secondary non-isolation adjustment ad transformer unit, which is adapted to transform the power supply signal put out by the primary isolation transformer unit into an expected voltage according to the setpoint control signal put out by the voltage adjustment control unit and to put out the adjusted power supply signal.

EP 3 291 446 A1 relates to a galvanical isolating circuit having a differential transformer with primary and secondary winding for the transmission of signals on a carrier between the primary and the secondary winding of the transformer. The primary and secondary winding have a galvanic insulation oxide layer between them and comprise center taps, which provide low-resistance pathways for direct current and low-frequency components of common mode currents through the differential transformer. A band pass stage, coupled to the secondary winding of the transformer, is configured such that it allows the propagation of signals on the carrier through the band pass amplifier stage and at the same time provides for a suppression of common mode noise.

Given this background, one problem to be solved was to provide a reliable supply of electric energy to a low-voltage onboard network of an electric vehicle that also fulfills the safety criteria for a use with highly automated driver assist systems.

BRIEF SUMMARY

Some embodiments relate to a system for the electrical power supply of an electric vehicle having at least one HV onboard network and at least one LV onboard network.

In the context of the present specification, a HV onboard network shall mean a high-voltage onboard network having a voltage level of more than 200 V, especially in the range of 300 V to 1200 V, such as 400 V or 800 V. A HV battery is a high-voltage energy accumulator with a rated output voltage in the range of 300 V to 1200 V, such as 400 V or 800 V. A LV onboard network shall mean a low-voltage onboard network, having a voltage level of less than 100 V, especially in the range of 10 to 60 V, such as 12 V or 48 V.

Some embodiments are designed for the electrical power supply of an electric vehicle, wherein the vehicle comprises multiple electrical participants, usually consumers or energy sources. The system is arranged in the vehicle and comprises a HV battery or accumulator having two branches connected in series, each having at least one energy accumulator cell. Each branch comprises at least one energy accumulator cell, such as a battery cell, and multiple energy accumulator cells can be connected to each other in parallel or in series in a respective branch.

The poles of the HV battery are connected across circuit breaker elements, such as battery contactors, to a HV onboard network of the vehicle, which comprises high-voltage units of the vehicle, such as electric machines for the propulsion, heating and cooling units, as well as charging modules for alternating current and/or direct current charging of the HV battery. An input of a cascading multistage DC/DC converter is connected respectively to the poles of the two sub-branches of the HV battery. In one embodiment, the cascading multistage DC/DC converter comprises a module for pole selection (HV+ versus HV−, $HV_{mean}$ versus HV−; HV+ versus $HV_{mean}$) with a galvanically non-isolated buck and/or boost stage situated at its output, feeding the primary side of a galvanically isolated main converter. The galvanically non-isolated buck and/or boost stage serves for ensuring a stable intermediate circuit voltage, and in this way the main converter can be operated at stabilized intermediate circuit voltage.

The pole selection module is designed to provide optionally at its output the voltage tapped from the poles of the HV battery, the voltage tapped from the poles of the first sub-branch, or the voltage tapped from the poles of the second sub-branch.

In one embodiment, the galvanically non-isolated buck and/or boost stage is designed as a step-down converter (buck converter). In another embodiment, the galvanically non-isolated buck and/or boost stage is designed as a step-up converter (boost converter). In yet another embodiment, the galvanically non-isolated buck and/or boost stage is designed as a step-down/step-up converter (buck/boost converter).

In one embodiment, the main converter comprises a transformer and an AC/DC converter unit, which is connected to the secondary winding of the transformer. In one embodiment, a center tap of the secondary winding is used at the secondary side (center tap technology). In another embodiment, an active full bridge is used at the secondary side. In yet another embodiment, a passive or active rectifier is used. In still another embodiment, a current doubler is used.

Among the features of the energy system described herein is that a center tap of the HV battery achieves an enhanced availability of the voltage supply. In addition, the DC/DC converter is moved in front of the main contactors, so that it does not need to be isolated from the power supply voltage in event of a fault in a QM consumer. The power supply of the LV onboard network continues to be assured in event of a fault.

The center tap of the HV battery creates two sub-banks, each having half the system voltage. The energy system described herein has a DC/DC converter topology, which can optionally utilize one of the two battery banks or the entire HV battery. In normal operation, each phase carries the respective half-power to the transformer. In event of a fault of one battery bank, the full power can be put out to the low-voltage onboard network through the remaining phase.

It is possible for the DC/DC converter to be situated as an external component outside the energy accumulator or to be integrated as an internal component in the energy accumulator.

Among the benefits of the energy system described herein are that a better system efficiency can be achieved, despite the multistage topology of the DC/DC converter, since each sub-converter can be designed more efficiently (e.g., slight voltage spread). Galvanically connected DC/DC converters thanks to the absence of a transformer have efficiency advantages over a galvanic isolation. The galvanically isolated main converter is operated with a relatively stable intermediate circuit voltage and can thus be operated for example as a more efficient resonance converter. The DC/DC converter described herein can be enlarged in modular fashion and it can be used in rigid HV networks even without prestages.

Some embodiments relate to a method for the electrical power supply of an electric vehicle, comprising at least one HV onboard network and at least one LV onboard network, and a HV battery, which comprises a first sub-branch and a second sub-branch, which are switched in series. In the method, the at least one HV onboard network is connected to the poles of the HV battery and supplied with electrical energy, and the at least one LV onboard network is connected to the output of a multistage cascading DC/DC converter, in which a first input is connected to the first sub-branch, and a second input is connected to the second sub-branch, and supplied with electrical energy.

The multistage cascading DC/DC converter is operated with the full power at full system voltage ($U_{HV}$). The buck and/or boost converter is passive or set at a defined intermediate circuit voltage high or low. The main converter works with the optimal intermediate circuit voltage.

In event of a fault in one sub-branch, the remaining sub-branch is switched to the input of the buck and/or boost converter. In this way, a stable power network supply is achieved with slightly larger componentry expense.

In one embodiment, the output voltage of the HV battery has a value in the range of 200 to 1200 V, such as in the range of 400 V to 800 V.

In one embodiment, the output voltage of the DC/DC converter has a value in the range of 10 to 60 V, such as in the range of 12 V to 48 V.

In the method, a HV battery and a DC/DC or direct current/direct current converter having two independent inputs are used, the HV battery comprising two branches each having at least one energy accumulator cell and each branch of the energy accumulator and each input of the DC/DC converter being connected to each other at both sides via conductors, and the poles of the HV energy accumulator provide a HV voltage for the at least one HV circuit and the output of the DC/DC converter provides a LV voltage for the at least one LV circuit of the vehicle.

It is possible to implement one embodiment of this method with one embodiment of the proposed system.

In this case, a higher availability is provided for the at least one LV circuit than for the at least one HV circuit.

In the method, electric energy can be exchanged unidirectionally or bidirectionally between the branches or their energy accumulator cells of the HV battery and the participants of the at least one HV onboard network. It is possible for at least one participant to be supplied with electric energy from the HV battery, i.e., from at least one branch of the HV battery. Accordingly, it is possible to charge at least one branch of the HV battery with electric energy from at least one participant or to charge the participant and store electric energy in it. A participant is configured for example as an electric machine for propelling the vehicle, which in one operating mode as an electric motor transforms electric energy from the HV battery into mechanical energy and moves the vehicle. In one operating mode as an electric generator, the electric machine transforms mechanical energy due to motion into electric energy, for example during a recuperation, which is stored in the HV battery. If it is possible for a participant to be configured for example as a fuel cell and thus as an energy source, the electric energy of which can likewise be stored in the HV battery. At least one further participant can be designed as an actuator, sensor and/or device, for example, at least one controller of the vehicle.

Thanks to the above described layout of the DC/DC converter and its connection to the branches of the HV battery, a highly available electricity supply of the LV onboard network of the vehicle is provided in a realization of the method and the system. In this case, the LV onboard network is supplied with electric energy from two branches of the HV battery by the DC/DC converter. The branches of the HV battery, which can also be called sub-branches, form together with the inputs of the DC/DC converter parallel power supply pathways for the participants, such as consumers, of the LV onboard network. A fault in one branch will not result in a fault, especially a complete failure, of the electrical power supply of the LV onboard network, since its availability is enhanced thanks to the parallel arrangement of the branches relative to each other. The HV battery can be realized by a variable battery concept, it being conceivable for the branches to have many different energy cells and/or different designs of energy cells, such as battery cells and/or capacitors. Thanks to the parallel power supply through the DC/DC converter, a fault in one input module does not result in a fault of the electrical power supply of the LV onboard network.

Of course, the above mentioned features and those yet to be explained in the following can be used not only in the particular indicated combination, but also in other combinations or standing alone, without leaving the scope of the present disclosure.

BRIEF DESCRIPTION OF THE SEVERAL VIEWS OF THE DRAWINGS

Embodiments of the invention are represented schematically with the aid of the drawing and shall be described schematically and at length with reference to the drawing.

FIG. 1 shows in schematic representation a cutout view of one embodiment of a system to carry out one embodiment of a method.

DETAILED DESCRIPTION

FIG. 1 shows schematically a cutout view of one embodiment of the energy system 100. Not shown are the connection of the HV battery 10 to the HV onboard network, the HV onboard network, or the LV onboard network of the vehicle.

The HV battery 10 comprises a first sub-branch 11 and a second sub-branch 12. To the first sub-branch 11 is connected a first input of a pole selection module 21 of a cascading multistage DC/DC converter 20, to the second sub-branch 12 is connected a second input of the pole selection module 21 of the DC/DC converter 20. Hence, a center tap of the HV battery 10 is realized. The pole selection module 21 allows the selection between three different voltage taps on the HV battery 10: HV+ versus HV−, $HV_{mean}$ versus HV−; HV+ versus $HV_{mean}$. At the output of the pole selection module 21 there is arranged a galvanically non-isolated step-down converter (buck stage) 22. This serves for assuring a stable intermediate circuit voltage. To the intermediate circuit is connected a galvanically isolated main converter 23, which is operated at the stabilized intermediate circuit voltage. The main converter 23 comprises a transformer 24 having a center tap. The center tap is utilized at the secondary side of the transformer 24 (center tap technology). The output of the DC/DC converter 20 is connected to the LV onboard network of the vehicle.

In normal operation at full system voltage (e.g., 800 V), Q2 is permanently conductive, Q3-Q6 are non-conductive. Q1 forms together with L1 and Q7 a step-down converter (buck topology) in order to regulate the voltage at the intermediate circuit (C_ZK) to a stable level (e.g., 400 V). The main converter 23 works with a stable input voltage in resonance mode.

In event of a fault in the first sub-branch 11, this is isolated from the rest of the system by a fuse. Then, only the second sub-branch 12 is still available with half the system voltage. In this case, Q1 is opened, while Q2, Q5 and Q6 remain closed. Q3 and Q4 are closed, Q7 remains opened. In this way, half the system voltage is applied hard to the intermediate circuit. The main converter continues to work unchanged.

In event of a fault in the second sub-branch 12, this is isolated from the DC/DC converter 20 by opening of Q2, Q3 and Q4. Q1, Q5 and Q6 now take the voltage of the first sub-branch 11 to the intermediate circuit.

German patent application no. 10 2021 128140.7, filed Oct. 28, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system for supplying electrical power to an electric vehicle that includes at least one first voltage onboard network and at least one second voltage onboard network, wherein a voltage of the first voltage onboard network is greater than a voltage of the second voltage onboard network, and a battery that is connected to the at least one first voltage onboard network, and wherein the battery comprises a first sub-branch and a second sub-branch that are switched in series, the system comprising:

a multistage cascading direct current to direct current (DC/DC) converter, wherein a first input of the multistage cascading DC/DC converter is connected to the first sub-branch, a second input of the multistage cascading DC/DC converter is connected to the second sub-branch, and an output of the multistage cascading DC/DC converter is connected to the at least one second voltage onboard network, wherein the multistage cascading DC/DC converter includes a pole selection module, a non-galvanically isolated step-down and/or step-up converter stage, and a galvanically isolated main converter stage, wherein the pole selection module includes a first transistor electrically coupled to the first input of the multistage cascading DC/DC converter, a second transistor electrically coupled to the second input of the multistage cascading DC/DC converter, a third transistor and a fourth transistor electrically coupled between a third input of the multistage cascading DC/DC converter and the first transistor, and a fifth transistor and a sixth transistor electrically coupled between the third input of the multistage cascading DC/DC converter and the second transistor, wherein, in normal operation, the first transistor and the second transistor are in a conductive state, and the third transistor, the fourth transistor, the fifth transistor, and the sixth transistor are in a non-conductive state, wherein, in response to a fault in the first sub-branch, the first transistor is controlled to be in the non-conductive state, and the fifth transistor and the sixth transistor are controlled to be in the conductive state, and wherein, in response to a fault in the second sub-branch, the second transistor is controlled to be in the non-conductive state, and the fifth transistor and the sixth transistor are controlled to be in the conductive state.

2. The system according to claim 1, wherein the non-galvanically isolated step-down and/or step-up converter stage is a step-down converter.

3. The system according to claim 1, wherein the non-galvanically isolated step-down and/or step-up converter stage is a step-up converter.

4. The system according to claim 1, wherein the non-galvanically isolated step-down and/or step-up converter stage is step-down/step-up converter.

5. The system according to claim 1, wherein the multistage cascading DC/DC converter includes an active or passive rectifier on a secondary side of a transformer.

6. The system according to claim 1, wherein the multistage cascading DC/DC converter includes an active full-bridge on a secondary side of a transformer.

7. The system according to claim 1, wherein the multistage cascading DC/DC converter includes a current doubler on a secondary side of a transformer.

8. The system according to claim 1, wherein the galvanically isolated main converter stage includes a transformer, and wherein a secondary winding of the transformer has a center tap that is utilized by the multistage cascading DC/DC converter at a secondary side of the transformer.

9. The system according to claim 1, wherein the pole selection module, in operation, provides at an output of the pole selection module a voltage tapped from poles of the battery, a voltage tapped from poles of the first sub-branch, or a voltage tapped from poles of the second sub-branch.

10. A method for supplying electrical power to an electric vehicle that includes at least one first voltage onboard network and at least one second voltage onboard network, and a battery, wherein a voltage of the first voltage onboard network is greater than a voltage of the second voltage onboard network, wherein the battery includes a first sub-branch and a second sub-branch, wherein the first sub-branch and the second sub-branch are switched in series, wherein the at least one first voltage onboard network is connected to poles of the battery and supplied with electrical energy, and the at least one second voltage onboard network is connected to an output of a multistage cascading direct current to direct current (DC/DC) converter, wherein the multistage cascading DC/DC converter includes a pole selection module, a non-galvanically isolated step-down and/or step-up converter stage, and a galvanically isolated main converter stage, wherein a first input of the multistage cascading DC/DC converter is connected to the first sub-branch, a second input of the multistage cascading DC/DC converter is connected to the second sub-branch and supplied with electrical energy, wherein the pole selection module includes a first transistor electrically coupled to the first input of the multistage cascading DC/DC converter, a second transistor electrically coupled to the second input of the multistage cascading DC/DC converter, a third transistor and a fourth transistor electrically coupled between a third input of the multistage cascading DC/DC converter and the first transistor, and a fifth transistor and a sixth transistor electrically coupled between the third input of the multistage cascading DC/DC converter and the second transistor, and wherein, in normal operation, the first transistor and the second transistor are in a conductive state, and the third transistor, the fourth transistor, the fifth transistor, and the sixth transistor are in a non-conductive state, the method comprising:
  in response to a fault in the first sub-branch:
    controlling the first transistor to be in the non-conductive state; and
    controlling the fifth transistor and the sixth transistor to be in the conductive state; and
  in response to a fault in the second sub-branch:
    controlling the second transistor to be in the non-conductive state; and
    controlling the fifth transistor and the sixth transistor to be in the conductive state.

* * * * *